(No Model.)
M. MATTISON.
COFFEE POT.
No. 419,965.  Patented Jan. 21, 1890.
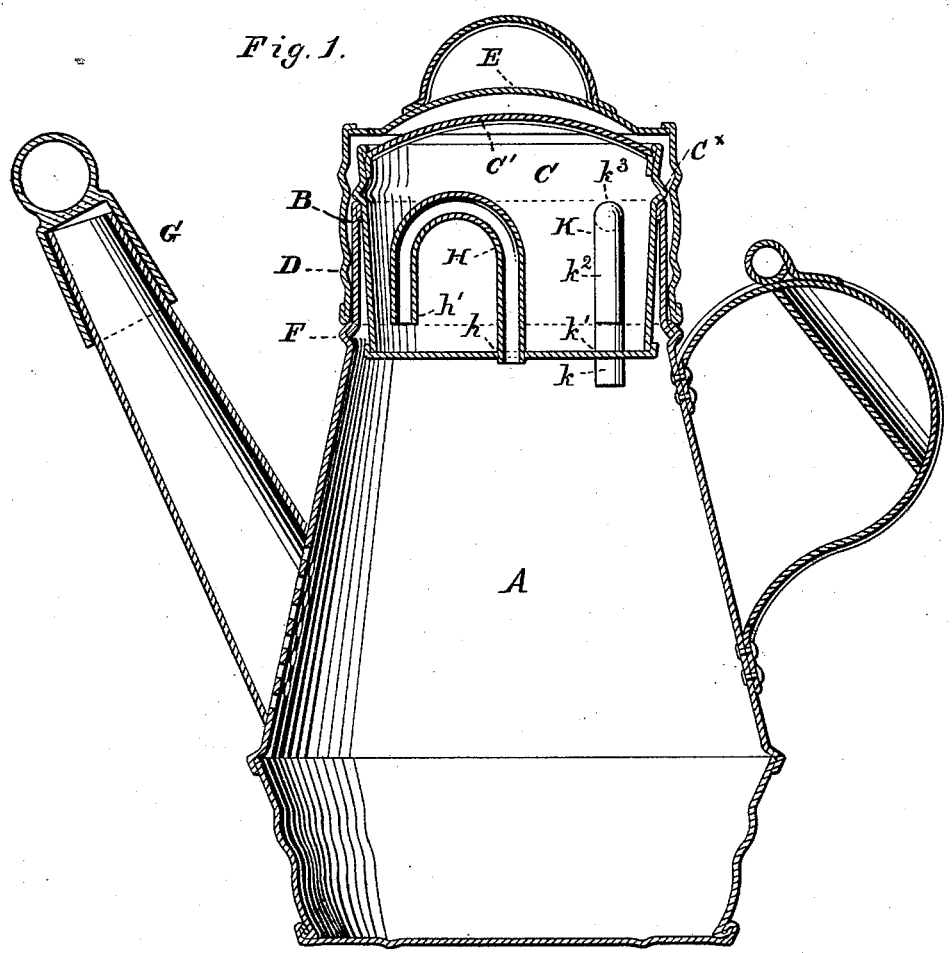
Witnesses
Villette Anderson,
Philip E. Masi.
Inventor
Munroe Mattison
By his Attorney
E. W. Anderson

UNITED STATES PATENT OFFICE.

MUNROE MATTISON, OF BUSTI, NEW YORK.

COFFEE-POT.

SPECIFICATION forming part of Letters Patent No. 419,965, dated January 21, 1890.

Application filed October 19, 1889. Serial No. 327,541. (No model.)

*To all whom it may concern:*

Be it known that I, MUNROE MATTISON, a citizen of the United States, and a resident of Busti, in the county of Chautauqua and State of New York, have invented certain new and useful Improvements in Coffee-Pots; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a vertical section. Fig. 2 is a detail and a perspective view, partly broken away on the side.

This invention has relation to coffee-pots; and it consists in the construction and novel combination of parts, as hereinafter set forth and claimed.

In the accompanying drawings, the letter A designates the lower or main vessel, which is preferably constructed with a copper-armed base, and is provided at its upper portion with the cylindrical bearing-rim B, which receives the upper vessel or steaming-chamber C, which is provided with a circumscribing bead or bearing $C^\times$ near its upper edge, designed to engage the upper edge of the cylindrical bearing-rim B of the main pot to limit the descent of the steam-chamber. The latter projects above the edge of the rim B a short distance, and this exposed portion is designed to be covered in by the drop cylindrical flange D of the top or cover E of the pot which engages the rim B on its outer surface and extends down to engage the stop-bead or bearing F on the main pot at the lower portion of said rim B, so that when said cover is in position the top of the pot is tightly closed. The spout is also closed by a thimble-cover G.

The steaming cup or vessel C is provided with the bent steam-tube H and the bent siphon K. The steam-tube H extends from the central opening $h$ in the bottom of the vessel C upward, and then bending over terminates in an open end $h'$, near the outer wall of the vessel and above its bottom, as shown. The siphon K is formed with a long leg $k$, which extends through an aperture $k'$ in the bottom of the vessel C upward therein, and is bent over to form the short leg $k^2$, which terminates above and near the bottom of said vessel. The bend $k^3$ of the siphon stands below the upper bearing-rim of the pot, and for pots of ordinary size about two inches above the bottom of the steaming-cup. This steaming cup or vessel is provided with a transverse bar or handle C'.

The operation of making coffee in this pot is as follows: The coffee is put into the main vessel A and hot water is poured upon it. Then the steaming-cup is placed in position in the upper part of the pot A and cold water to the depth of about one inch is poured therein. The outer or enveloping cover is then put in place, covering in the steaming-chamber, and, the spout having been closed, the coffee is put on to boil, the steam and vapor passing up through the tube H into the water in the chamber C, where it is condensed. When the coffee has boiled a sufficient time, the chamber C is to be filled with water, bringing its surface-level above the bend of the siphon, and then the contents of this chamber will pass down into the main vessel. The coffee is then made.

Having described this invention, what I claim, and desire to secure by Letters Patent, is—

The coffee-pot comprising the main pot having a suitable distance below its upper edge a circumscribing bearing or stop-bead, the steaming cup or chamber having a circumscribing bead or bearing resting upon the upper edge of said main pot, said steaming-cup also having a bent steam-pipe, and a siphon-pipe, the discharge end of said steam-pipe and the receiving end of said siphon-pipe reaching down within a short distance of the bottom of said cup, the drop-cover having a deep flange, the lower edge of which rests upon the stop-bead or bearing of the main body, substantially as set forth.

In testimony whereof I affix my signature in presence of two witnesses.

MUNROE MATTISON.

Witnesses:
WILLIAM NORTHRUP, Jr.,
CHAS. MATTISON.